No. 795,166. PATENTED JULY 18, 1905.
C. PIEZ.
GUIDE FOR CONVEYER CHAINS.
APPLICATION FILED JUNE 25, 1904.
2 SHEETS—SHEET 1.
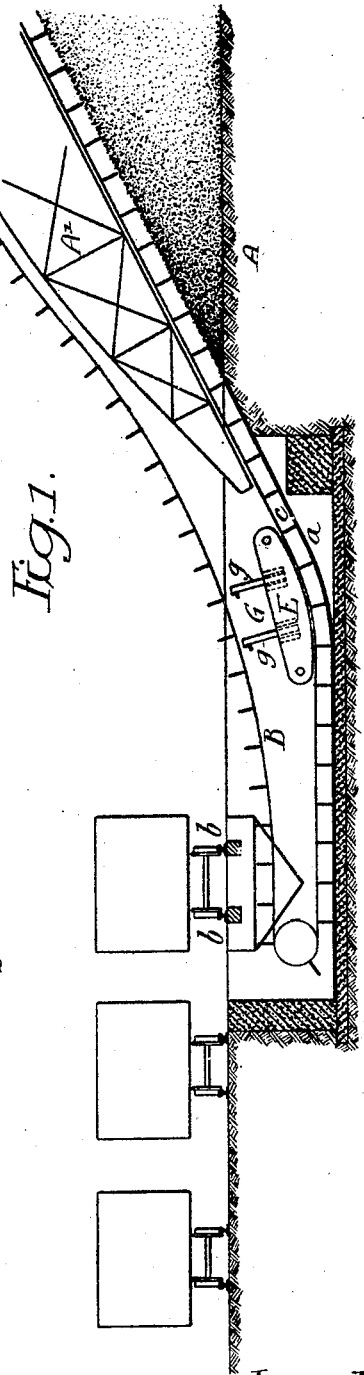
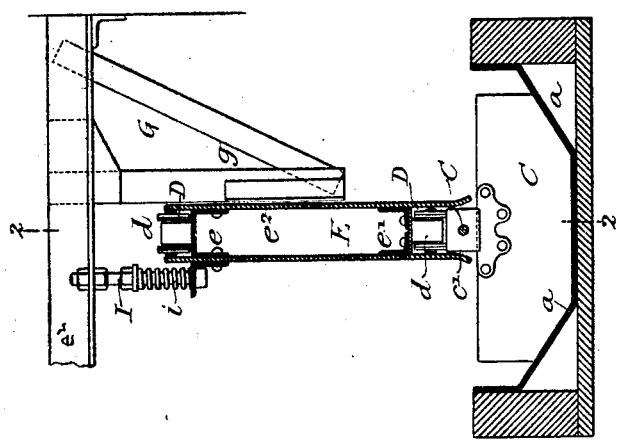
Witnesses:
Augustus B. Coppes
Titus J. ...
Inventor:
Charles Piez,
by his Attorneys
Howson & Howson

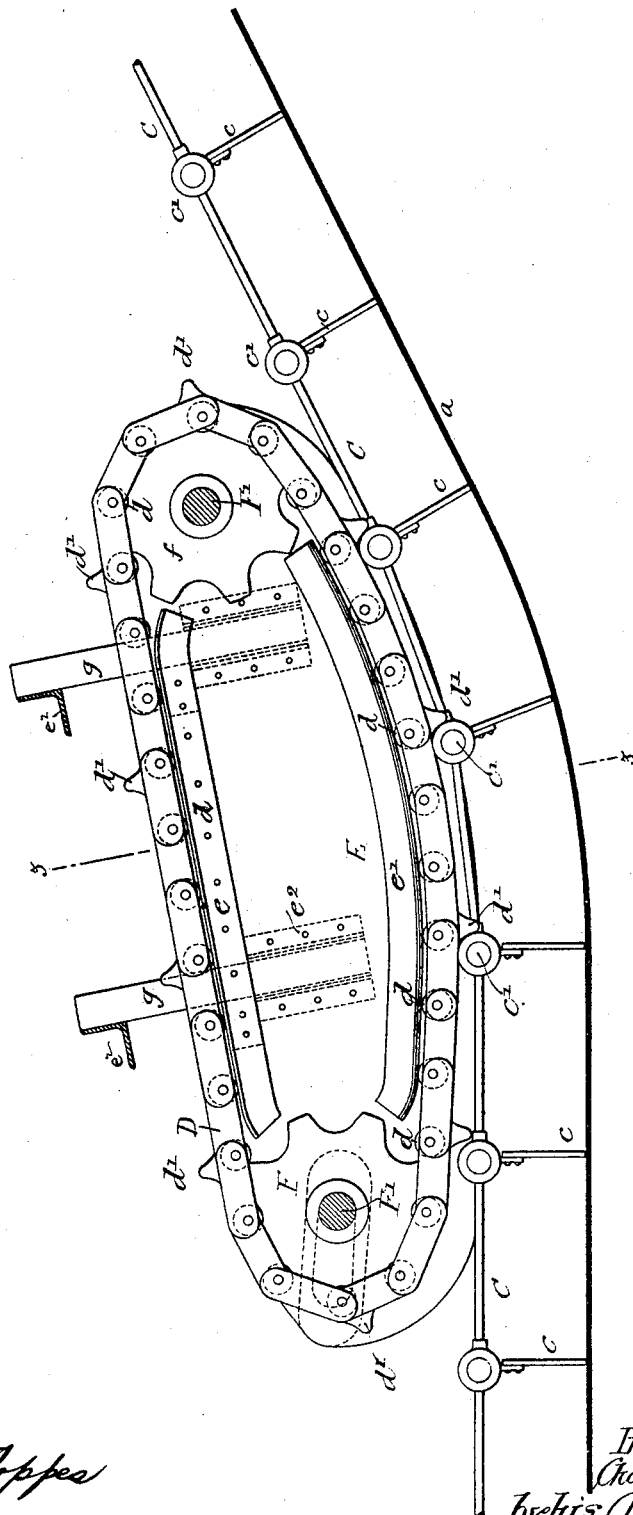

No. 795,166. Patented July 18, 1905.

UNITED STATES PATENT OFFICE.

CHARLES PIEZ, OF PHILADELPHIA, PENNSYLVANIA, ASSIGNOR TO THE DODGE COAL STORAGE COMPANY, OF NAUGATUCK, CONNECTICUT, A CORPORATION OF CONNECTICUT.

GUIDE FOR CONVEYER-CHAINS.

SPECIFICATION forming part of Letters Patent No. 795,166, dated July 18, 1905.

Application filed June 25, 1904. Serial No. 214,112.

*To all whom it may concern:*

Be it known that I, CHARLES PIEZ, a citizen of the United States, residing in Philadelphia, Pennsylvania, have invented certain Improvements in Guides for Conveyer-Chains, of which the following is a specification.

The object of my invention is to guide a conveyer-chain around a curve without undue friction and without making an abrupt turn. My invention is especially useful in connection with flight conveyer-chains used in coal-storage apparatus and is used for guiding the chain from the horizontal run to the inclined run, as described hereinafter.

The above object I attain in the following manner, reference being had to the accompanying drawings, in which—

Figure 1 is a diagram sectional view illustrating my invention. Fig. 2 is an enlarged longitudinal sectional view on the line 2 2, Fig. 3; and Fig. 3 is a transverse sectional view on the line 3 3, Fig. 2.

A is the piling-floor of a coal-storage plant. B is the pit into which the coal is discharged from the cars which are mounted on tracks $b\ b$.

A' is a truss structure which extends over the piling-floor and carries the endless conveyer-chain C, which has flights $c$. These flights travel over a trough $a$ within the pit and convey coal or other material from the pit to the piling-floor. The structure A' may be of any suitable type without departing from my invention.

Heretofore wheels have been used to guide the chain from the horizontal run in the pit to the inclined run over the piling-floor; but wheels are objectionable, as they make a too sudden turn in the conveyer, and to use a very large wheel is out of the question. I overcome this difficulty by mounting an endless chain D on a frame E, having guide-rails $e\ e'$ at top and bottom, respectively, and sprocket-wheels F at each end. Each sprocket-wheel is mounted on a shaft F', and one of the shafts may be made adjustable in its bearings to take up for wear on the chain D. Carried by the chain D are rollers $d$, which travel on the rails $e\ e'$, and consequently reduce the friction. At proper intervals on the chain D are lugs $d'$, with which engage the projections $c'$ on the chain, so that the endless guiding-chain D is driven by the conveyer-chain C.

It will be noticed that the guide-rails $e'$ can be of any length desired and can be curved to any desired degree.

G is the structure on which the frame E is mounted. In the present instance the frame has angle members $e^2$, between which extend the depending members $g\ g$ of the structure G, and carried by bolts I are springs $i$, which tend to hold the frame down so that the flight will scrape the trough $a$; but in the event of the flights passing over material the springs will yield, and thus prevent the breaking of parts of the mechanism.

It will be seen that by my invention large guide-wheels are dispensed with and the chain can pass from the horizontal line to a line at an angle thereto on a gentle curve.

I claim as my invention—

1. The combination in an endless-chain conveyer, of a guiding-frame having curved rails at the bottom, an endless chain on said frame, guided by said curved rails and driven from the conveyer-chain, substantially as described.

2. The combination in an endless-chain conveyer, of a guiding-frame, having rails and an endless chain having rollers arranged to travel on said rails and to guide the conveyer-chain, substantially as described.

3. The combination in an endless-chain conveyer, of a conveyer-chain, flights thereon, a pit and an inclined path over which the chain travels, a guiding-frame situated at the point where the direction of travel of the conveyer changes, said guiding-frame having a curved rail at the bottom, and an endless chain on the frame guided by the rails and driven from the conveyer, substantially as described.

4. The combination of a conveyer-chain, a frame, rails on said frame, a sprocket-wheel at each end of the frame, and endless chain arranged to pass around the sprocket-wheels and to travel upon the rails, and rollers carried by the chain said chain being driven by the conveyer-chain, substantially as described.

5. The combination of a conveyer-chain, a frame at the point where the chain changes direction, a curved rail on the frame, an endless chain having rollers and arranged to pass under the curved rail and to be engaged by the conveyer-chain, substantially as described.

In testimony whereof I have signed my name to this specification in the presence of two subscribing witnesses.

CHARLES PIEZ.

Witnesses:
 WILL A. BARR,
 JOS. H. KLEIN.